United States Patent
Gontina

(10) Patent No.: US 9,336,444 B2
(45) Date of Patent: May 10, 2016

(54) SYSTEM AND METHOD FOR OCCUPANCY DETECTION USING DIFFERENTIAL IMAGE SENSING AND OPTICAL MARKERS

(71) Applicant: Urjagreen Technologies Pvt. Ltd., Bangalore (IN)

(72) Inventor: Satya Kishore Gontina, Hyderabad (IN)

(73) Assignee: Urjagreen Technologies Pvt. Ltd., Bangalore (IN)

( * ) Notice: Subject to any disclaimer, the term of this patent is extended or adjusted under 35 U.S.C. 154(b) by 252 days.

(21) Appl. No.: 14/224,301

(22) Filed: Mar. 25, 2014

(65) Prior Publication Data

US 2014/0293032 A1 Oct. 2, 2014

(30) Foreign Application Priority Data

Mar. 26, 2013 (IN) ............................ 1300/CHE/2013

(51) Int. Cl.
  *H04N 9/47* (2006.01)
  *H04N 5/765* (2006.01)
  *G06K 9/00* (2006.01)

(52) U.S. Cl.
  CPC .................................. *G06K 9/00771* (2013.01)

(58) Field of Classification Search
  CPC ............................ H04N 7/18; G06K 9/00771
  USPC ................. 348/77, 92, 94, 116; 386/200, 224
  See application file for complete search history.

(56) References Cited

U.S. PATENT DOCUMENTS

| | | | | |
|---|---|---|---|---|
| 2014/0363051 A1* | 12/2014 | Burry | ................... | G06K 9/2027 382/105 |
| 2015/0087417 A1* | 3/2015 | George | ............... | G07F 17/3237 463/31 |

* cited by examiner

*Primary Examiner* — Robert Chevalier
(74) *Attorney, Agent, or Firm* — The Law Office of Austin Bonderer, PC; Austin Bonderer

(57) ABSTRACT

A system and method for detecting occupancy of live objects, using differential image sensing and optical markers is provided. The system includes a live object(s) or a human, a stationary object(s), an image capturing device, an imaging system, a network, and an occupancy determination and parsing server. The image capturing device may capture the image sequences from a physical location which may be within the camera viewing area. The image capturing device may also be configured to track motions of the live objects. The imaging system may be connected to the occupancy determination and parsing server through the network. The occupancy determination and parsing server based on the information received from the imaging system may determine whether the physical location is occupied with the live objects or the stationary objects. The occupancy determination module and parsing server may be connected with at least one the imaging system.

20 Claims, 5 Drawing Sheets

SYSTEM AND METHOD FOR OCCUPANCY DETECTION USING DIFFERENTIAL IMAGE SENSING AND OPTICAL MARKERS

BACKGROUND

1. Technical Field

The embodiments herein generally relate to occupancy detection of a live object(s) and, more particularly, to a system and method for occupancy detection using differential image sensing and optical markers.

2. Description of the Related Art

Detecting whether a physical space or a location has been occupied by a person/object is of enormous value. By determining the occupancy information of a person or object the information can be used for wide variety of applications. Some of the applications where occupancy detection is useful are lighting and HVAC (heating, ventilation, and air conditioning) control in buildings to use energy more efficiently depending on a particular room/space is occupied, home automation systems where specific actions like turning on/off the TV/Music system or other devices can be taken into consideration to determine whether a given room is occupied by a human being or not, intelligent burglar alarm systems which only detect motion of human sized objects and prevent false positives like pets etc., intelligent burglar alarm systems that are active only in certain parts of premises depending on the time of the day and space usage patterns, asset tracking where an object is tracked, when moved from a predetermined position to a new location, etc. It can also be helpful in an emergency safety application, where the system will tell a central console as to the number and location of live objects during an emergency such as fire, earthquake, etc. This will be extremely helpful if the emergency takes place during non-working hours and there are a small number of people to be rescued on from a building floor. Such application facilitates need for a robust occupation detection system with accurate tracking of moving or live objects.

Occupancy detection has been traditionally carried out in two different methods. First method is physically tagging the object that needs to be tracked by using RFID or other radio tags and while second method involves using active components or systems such as IR beams, motion sensors, physical switches, etc. installed in a physical area to track the motion of moving objects, whenever the moving objects interacts with any one of those sensors.

The problem with both these techniques is that the object that needs to be tracked is in some way has to interact with the tracking system. This creates problems like mechanical wear and tear of the tracking system, inventory tracking of the tags etc. Accordingly, there remains a need for a new technique where the moving or target objects are in no way interacting with the sensors or is attached to the object being tracked, but instead a system has to be installed in the physical location where the objects is tracked for occupancy without any direct contact or interaction with the tracking system.

SUMMARY

The embodiment herein discloses a system for detecting occupancy of a live object using differential image sensing and optical markers. The system includes at least one image capturing device, e.g. a camera, configured to capture image sequences of a physical location. Further, including an image processing module, that obtains a first set of information at first time and a second set of information at second time. The image subtraction module, subtracts, the second set of information obtained at second time, with the first set of information obtained at first time, to obtain image information on the stationary object(s) and the live object(s) in a physical location. The motion estimation module, estimates, a motion of the live object(s), with the camera, which is configured to track motions of the live, animate and moving objects.

The tag detection module identifies tags from the images sequences captured with the image capturing device, to obtain information on the tags which are blocked by the live object(s). The occupancy determination module collates and compares, the image information on the live object(s) obtained from the image subtraction module, the information of on the live object(s) obtained from the motion estimation module, and the information on the tags which are blocked by the live object(s), to determine occupancy of the live object(s) in the physical location. In view of the foregoing, an embodiment herein provides a system and method for detecting occupancy of the live objects using differential image sensing and optical markers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
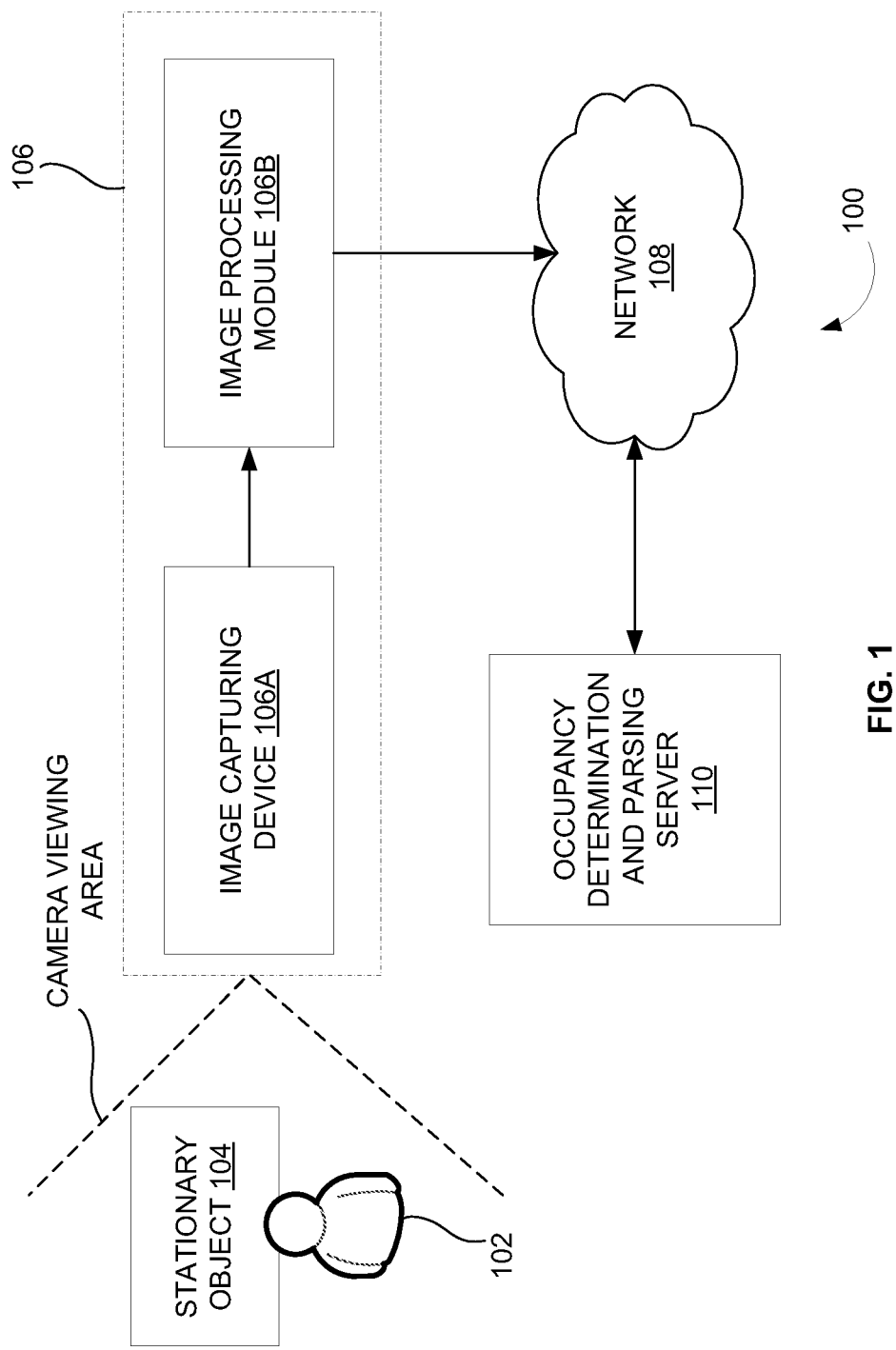
FIG. 1 is a system view illustrating an image capturing device, capturing an image sequence of an object within a camera viewing area and the system interacting with a network to determine the presence of a live object according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique where the moving or target objects are in no way interacting with the sensors or is attached to the object being tracked, but instead a system has to be installed in the physical location where the objects is tracked for occupancy without any direct contact or interaction with the tracking system. The embodiments herein achieve this by providing a new technique for occupancy detection using differential image sensing and optical markers.

A variety of techniques may be used detect a live objects in a given image. In one embodiment, object detection through image subtraction and object detection through interference in optical tags placed in a physical space may be proposed. The basis for image subtraction lies in taking two images and subtracting them to detect parts of the image that may have been changed. The optical tags when blocked by the live objects may help to detect and determine occupancy of a moving object.

The two images of a same physical space may be taken at two different times (e.g. a first time and a second time). Where the first time may be during weekdays, when the live objects are more likely to be present and the second time may be during night, holidays or weekends, when the live objects are less likely to be present. In one embodiment, the images captured at the first time may be at same time of the day as the second time, but different day of the week. In another embodiment, the images captured at the second time may be at same time of the day as the first time, but different day of the week.

The images, captured at the first time and the second time, may attribute to same lighting and shadow conditions. The images captured at the second time may be used as a background image for image subtraction. In one embodiment the live objects may be a human. In another embodiment, a stationary object or non-live objects may be a chair, a table or a ceiling fan, a window pane, etc. or like, other than human or live objects. The image capturing device or a camera may operate under a visible wavelength or an infrared wavelength or a combination. Referring now to the drawings, and more particularly to FIGS. 1 through 5, where similar reference characters denote corresponding features consistently throughout the figures, preferred embodiments are shown.

FIG. 1 is a system view 100 illustrating an image capturing device 106A, capturing an image sequence of an object within a camera viewing area and the system interacting with a network 110 to determine the presence of a live object 102 according to an embodiment herein. The system view 100 may include a live object(s) or a human 102, a stationary object(s) or non-living object 104, an imaging system 106, a network 108, and an occupancy determination module and parsing server 110. The imaging system 106 may include an image capturing device 106A and an image processing device 106B.

The image capturing device 106A may capture the image sequences from a physical location which may be within the camera viewing area. The physical location may be occupied with the live objects 102 and/or the stationary objects 104. The image capturing device 106A may be configured to track motions of the live objects 102. The image processing module 106B may normalize the images captured by the image capturing device 106A. The normalization may be performed for enhancing image lighting, minimize shadow effect, remove changing background, etc.

The imaging system 106 may process the image sequences captured from the image capturing device 106A to obtain information on the live objects 102 and/or the stationary objects 104. The imaging system 106 may be connected to the occupancy determination module and parsing server 110 through the network 108. The occupancy determination module and parsing server 110 based on the information received from the imaging system 106 may determine whether the physical location is occupied with the live objects 102 and/or the stationary objects 104. The occupancy determination module and parsing server 110 may be connected with at least one the imaging system 106.

Figure 2:
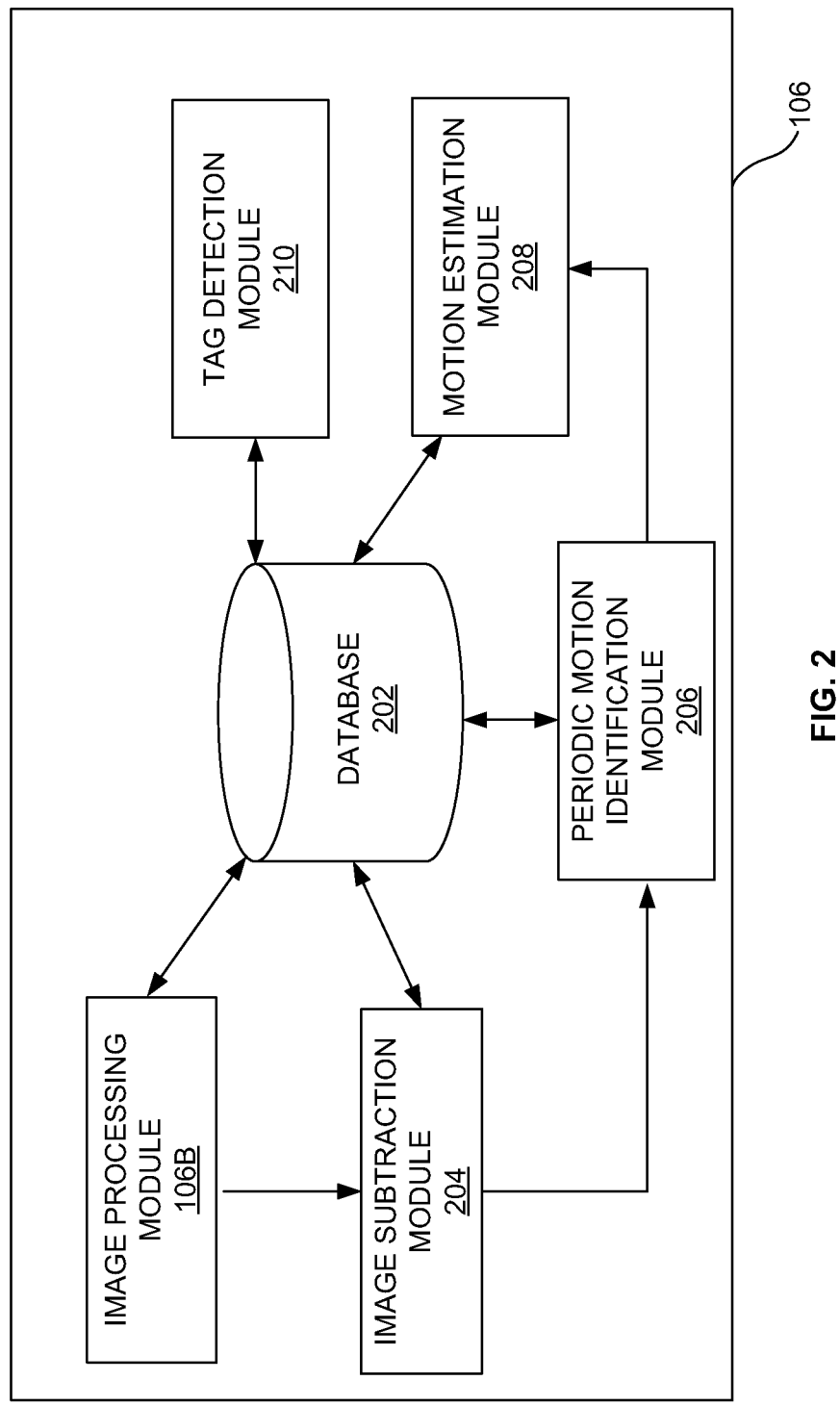
FIG. 2 illustrates an exploded view of an imaging system of FIG. 1 according to an embodiment herein.

FIG. 2 illustrates an exploded view of an imaging system 106 of FIG. 1 according to an embodiment herein. The imaging system of 106 may include a database 202, the image processing module 106B, an image subtraction module 204, a periodic motion identification module 206, a motion estimation module 208, and a tag detection module 210. The imaging system 106 may further include an image capturing device 106A.

The image processing 106B module may obtain a first set of information from at least one of the image capturing device 106A at the first time. The image processing 106B module may also obtain a second set of information from at least one of the image capturing device 106A at the second time. The first set of information may include image information on the live object(s) 102, the stationary object(s) 104, a current light level, and a current shadow levels. The second set of information may include image information on the live object(s) 102, the stationary object(s) 104, a current light level, and a current shadow levels.

The image subtraction module 204 may subtract the second set of information obtained at the second time, with the first set of information obtained at the first time, to obtain image information on the stationary object(s) 104 and the live object(s) 102 in the physical location. The periodic identification module 206 may detect a periodic motion of the stationary object(s) 104. The stationary object(s) 104 may have a self-motion such as of a table fan, a moving chair, waving trees or plants in the background but not limited to embodiments mentioned herein. The self-motion may be an inherit property of the stationary object(s) 104 in one example embodiment.

The motion estimation module 208 may estimate a motion of the live object(s) 102, with the image capturing device 106A. The image capturing device 106A may be configured to track motions of live, animate and moving objects, to obtain information of the live object(s) 102. The tag detection module 210 may identify tags from the image sequences captured with image capturing device 106A.

The tag detection module 210 may obtain information on the tags which are blocked by the live object(s) 102. In one embodiment, the information obtained from the tag detection module 210 may help in determining the presence of the live objects(s) 102. The tags or optical markers used in the system may be a quick response QR code tags. The system may track all the optical markers that are located in the given physical location.

The optical markers may be located in strategic locations such that they will be blocked if the live object(s) 102 appears in the cameras viewing area. In one example embodiment, in a typical office space putting the optical marker on the chair where a person sits or a strategic place on their desk will make the person block the optical marker from the overhead cameras field of view.

The occupancy determination and parsing server 110 may collate and compare the image information on the live object(s) 102 obtained from the image subtraction module 204, the information of the live object(s) 102 obtained from the motion estimation module 208, and the information on tags obtained from tag detection module 210, to determine occupancy of the live object(s) 102 in the physical location.

In embodiment, the system may have a privacy mask which may take any recognizable features out of any image that may be captured by the image capturing device 106A. The identification of the features may be obtained from the output of the image subtraction module 204. The identification of the live object(s) 102 may be replaced with a rectangular blocks of similar sizes with no inherent features. The privacy masking may ensure no identifiable data is ever captured in the images and only the image data useful for occupancy information is recorded.

Figure 3:
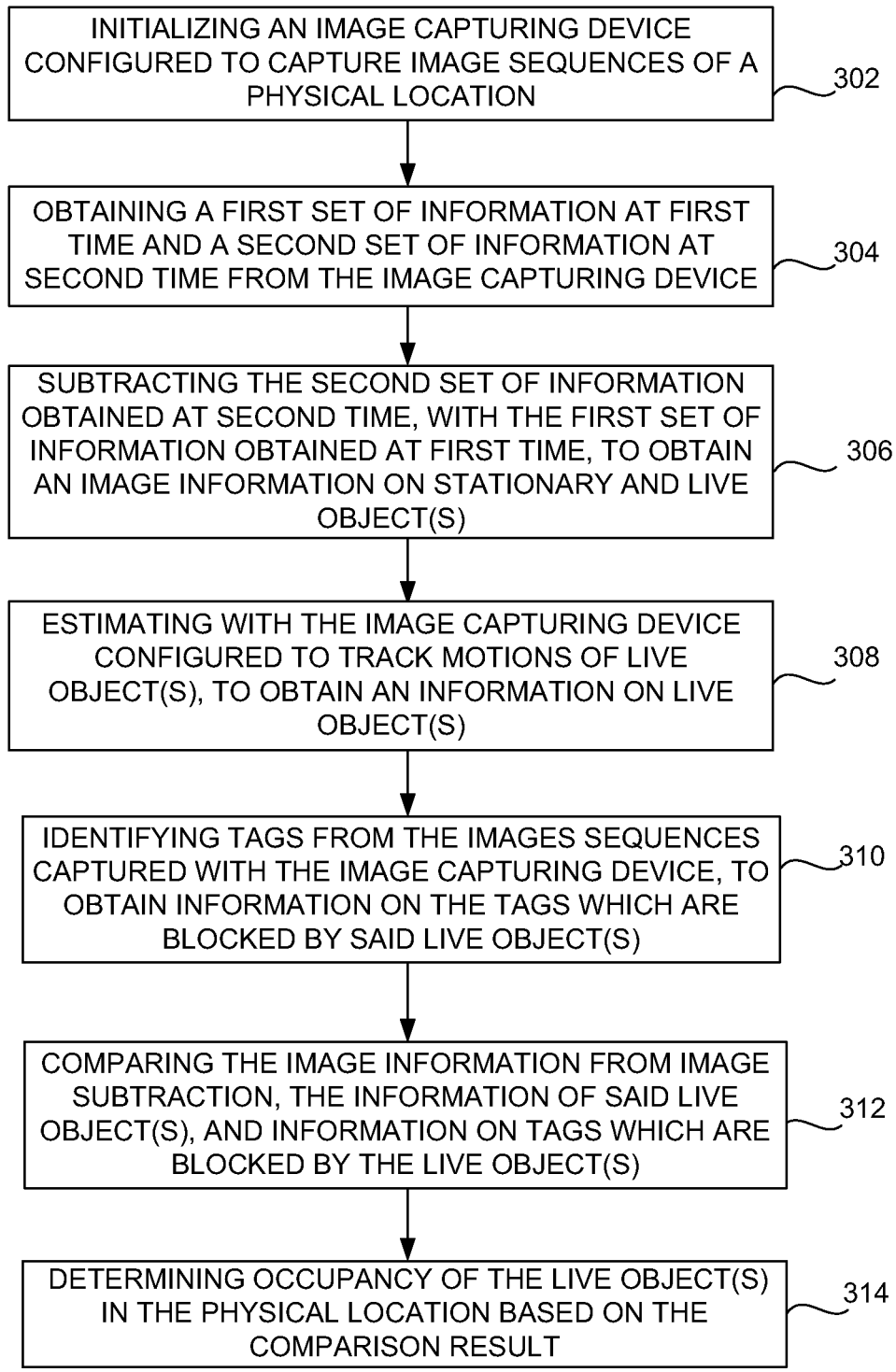
FIG. 3 is a flow diagram illustrating a method for determining occupancy of a live object(s) in a physical location according to an embodiment herein.

FIG. 3 is a flow diagram illustrating a method for determining occupancy of a live object(s) in a physical location according to an embodiment herein. In step 302, the image capturing device 106A is initialized to obtain an image sequence of the physical location. In step 304, from the image capturing device 106A obtain a first set of information at a first time and a second set of information at a second time (e.g. through the image processing module 106B).

In step 306, subtracting the second set of information obtained at the second time, with the first set of information obtained at the first time, to obtain an image information on the stationary object(s)104 and the live object(s) 102 (e.g. through the image subtraction module 204). In step 308, estimate motions of the live object(s) 102 (e.g. through the image capturing device 106A), to obtain an information on live object(s) 102. In step 310, identify tags, from the images sequences captured with the image capturing device 106A, to obtain an information on the tags which are blocked by the live object(s) 102 (e.g. through the tag detection module 210). The tag may be a quick response QR code tag or optical marker.

In step 312, the image information obtained from the image subtraction module 206, the information obtained on the live object(s) 102 (e.g. through the motion estimation module 208), and the information on tags, which are blocked by the live object(s) 102 (e.g. through the tag detection module 210) is collated and compared (e.g. in the occupancy determination and parsing server 112). In step 314, determine occupancy of the live object(s) 102 in the physical location based on the comparison result (e.g. in the occupancy determination and parsing server 112).

Figure 4:
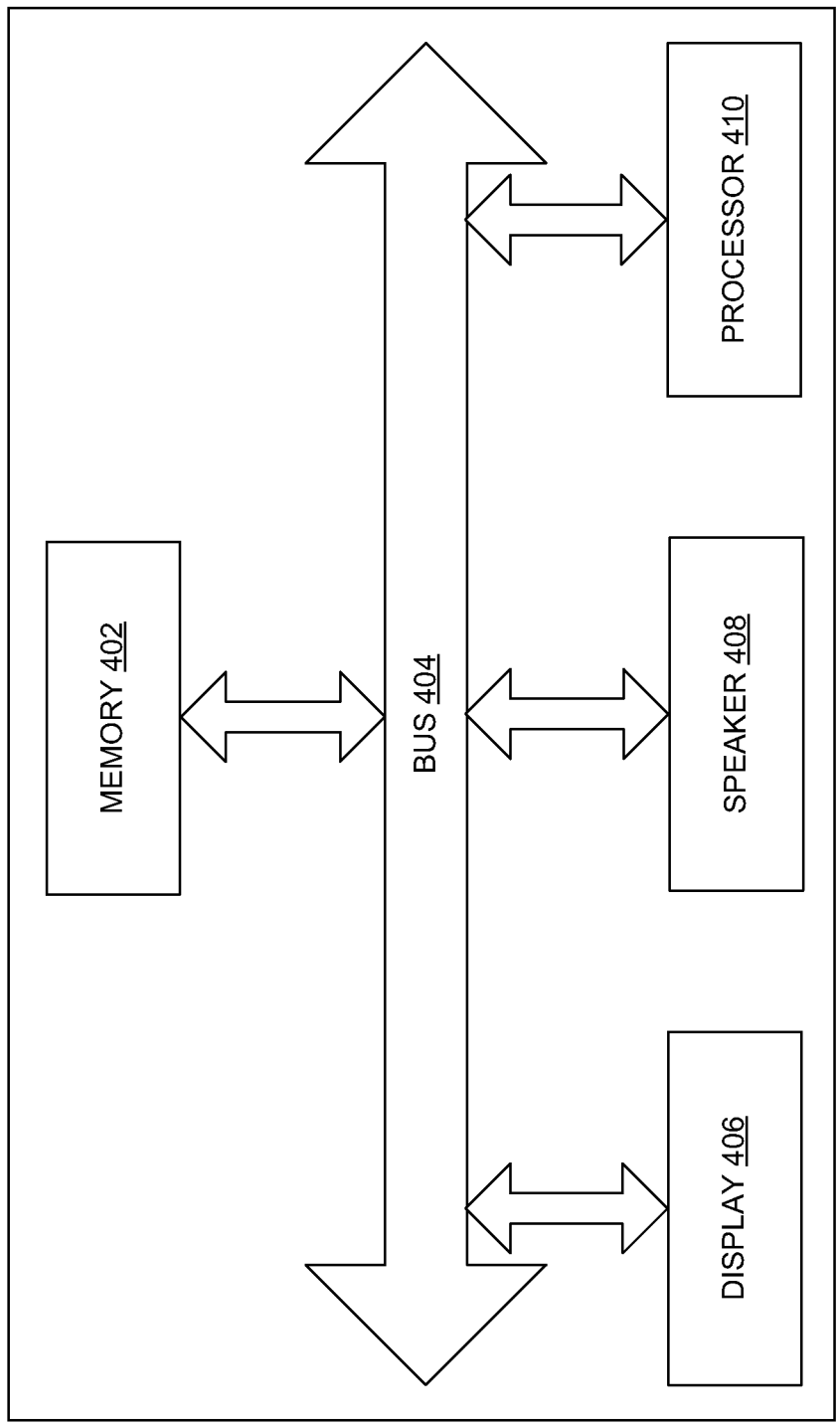
FIG. 4 illustrates an exploded view of a receiver used in accordance with the embodiments herein.

FIG. 4 illustrates an exploded view of a receiver of having an a memory 402 having a set of computer instructions, a bus 404, a display 406, a speaker 408, and a processor 410 capable of processing a set of instructions to perform any one or more of the methodologies herein, according to an embodiment herein. The processor 410 may also enable digital content to be consumed in the form of video for output via one or more displays 406 or audio for output via speaker and/or earphones 408. The processor 410 may also carry out the methods described herein and in accordance with the embodiments herein.

Digital content may also be stored in the memory 402 for future processing or consumption. The memory 402 may also store program specific information and/or service information (PSI/SI), including information about digital content (e.g., the detected information bits) available in the future or stored from the past. A user of the receiver may view this stored information on display 406 and select an item of for viewing, listening, or other uses via input, which may take the form of keypad, scroll, or other input device(s) or combinations thereof. When digital content is selected, the processor 410 may pass information. The content and PSI/SI may be passed among functions within the receiver using the bus 404.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
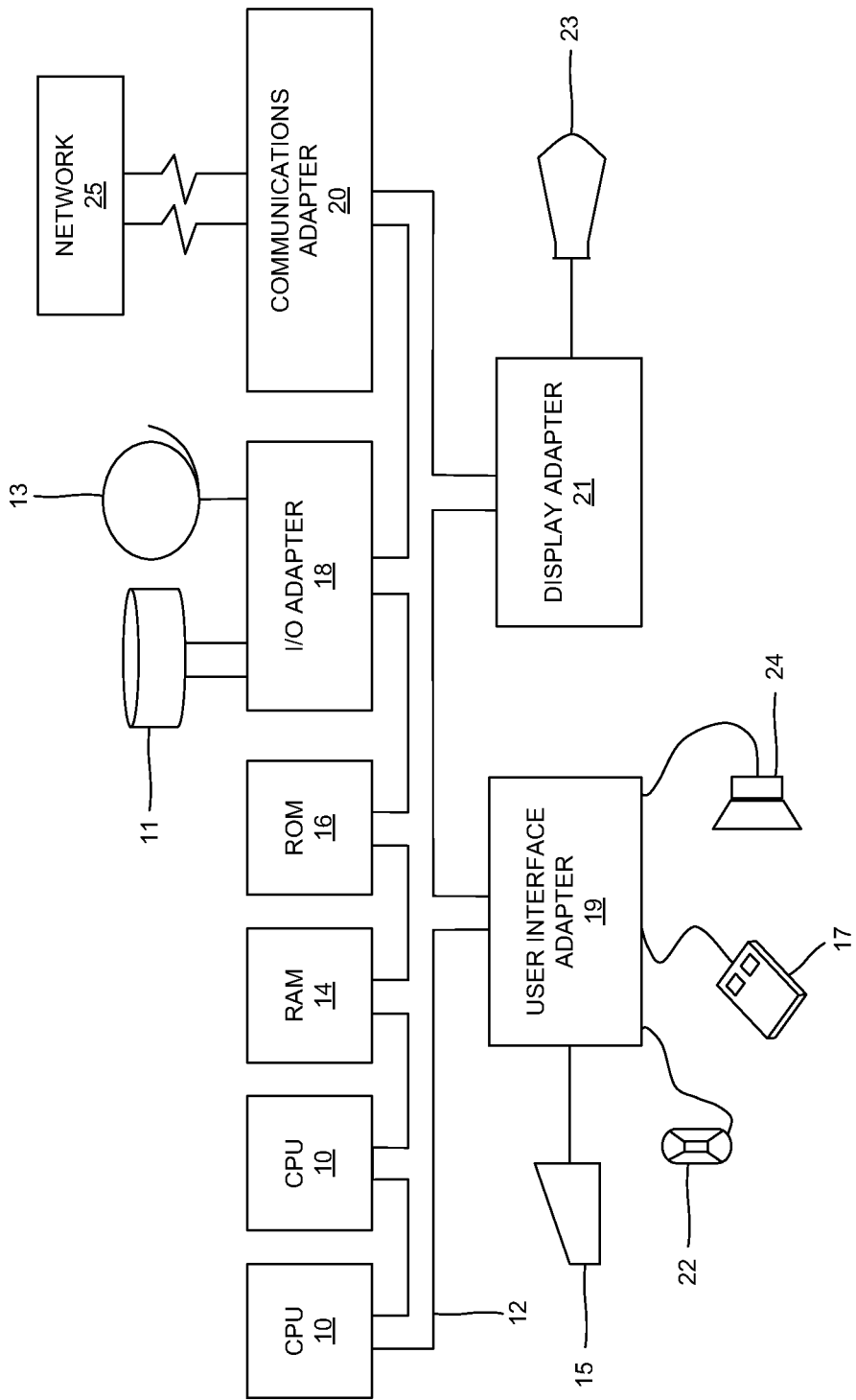
FIG. 5 illustrates a schematic diagram of a computer architecture according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

In one embodiment, the system and method enables to detect if a physical space has been occupied by the live object(s) 102 and/or the stationary object(s) 104. Furthermore, the system is completely passive and in no way interacts with the object that is tracked. In another embodiment the system stops tracking the objects and only detects the occupancy of the physical spaces. The grid of cameras (e.g. the image capturing device 106A) may be connected with each other through the network 110. Each camera may be set up or associated with pre-determined locations in the physical space.

In one example embodiment, to capture changing background images, the system may capture the changing background lighting conditions separately, on a different day. The lightings levels change very uniformly when comparing two different days in a given week. The system may train itself by taking pictures of an empty physical space every few minutes. The images captured over the day may be used as image subtraction backgrounds for images that are taken at the same time of the day but at different days of the week.

In another example embodiment, the periodically moving object may be captured in the sequence of images, taken over a period of a few minutes and assigning a 'set' of background values to every pixel in the images instead of just one background value. In one embodiment, the property of a periodic motion, with total number of variations of values for a given pixel may remain fixed and not continuously changing comparable in cases when an object is moving a-periodically. The system may capture most objects that move periodically, with a period of a couple of seconds and ignore them from the foreground and make them part of the standard background and may be used for subtraction.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. An occupancy detection system for detecting occupancy of live objects in a physical location, said occupancy detection system comprising:

a memory that stores computer executable instructions, a set of modules and a database;

a display unit; and a processor configured by said computer executable instructions, that executes said set of modules, said set of modules comprising:

at least one image capturing device executed by said processor, wherein said at least one image capturing device captures image sequences of said physical location;

an image processing module, executed by said processor, that obtains a first set of information from said at least one image capturing device at a first time and a second set of information from said at least one image capturing device at a second time, wherein said first set of information comprises an image information on at least one of (a) live objects, (b) stationary object(s), (c) current light levels, and (d) current shadow levels of said image sequences, and wherein said second set of information comprises an image information on at least one of (a) live object, (b) stationary object(s), (c) current light levels, and (d) current shadow levels of said image sequences;

an image subtraction module executed by said processor, wherein said image subtraction module subtracts said second set of information obtained at said second time from said first set of information obtained at first time, to obtain an image information on (i) said stationary object(s), and (ii) said live object(s) in said physical location;

a motion estimation module, executed by said processor, that estimates a motion of said live object, with at least one of said image capturing device, configured to track motion to obtain an information of said live object(s);

a tag detection module, executed by said processor, that identifies tags from said images sequences captured by said at least one image capturing device, to obtain information on said tags which are blocked by said live object(s); and an occupancy determination module executed by said processor, wherein said occupancy determination module collates and compares (i) said image information on said live object(s) obtained from said image subtraction module, (ii) said information of said live object(s) obtained from said motion estimation module, and (iii) said information on tags which are blocked by said live object(s), to determine occupancy of said live object(s) in said physical location.

2. The system of claim 1, wherein said image subtraction module comprises:

a light equalization module executed by said processor, wherein said light equalization module normalizes lighting levels of said image sequences captured from said at least one image capturing device;

a shadow removal module, executed by said processor, that is configured to minimize shadows in said image sequences captured from said at least one image capturing device; and a periodic motion identification module, executed by said processor, that is configured to periodically select said image sequences captured at said first time and said second time, wherein said captured images sequences at said second time is subtracted from images captured at said first time, to obtain an image information with pixel value of said image sequences on motion of said stationary object(s).

3. The system of claim 1, wherein said motion estimation module comprises a periodic identification module, executed by said processor, that detects a periodic motion of said stationary object(s), wherein said periodic motion is a movement of said stationary object occurring at regular intervals.

4. The system of claim 3, wherein said stationary object(s) comprises a self-motion, wherein said self-motion is a table fan, a moving chair, waving trees or plants in the background.

5. The system of claim 1, wherein said tags are a Quick Response (QR) code tags.

6. The system of claim 5, wherein said Quick Response (QR) code tags is physically tagged to said stationary object(s) in said physical location.

7. The system of claim 5, wherein said QR code tag is configured to be detected by said image capturing device.

8. The system of claim 1, wherein said live objects is masked for privacy protection without affecting inherited property of detected said live objects.

9. The system of claim 8, wherein said privacy protection is performed before or after determining occupancy of said live objects in said physical location.

10. A non-transitory program storage device readable by computer, and comprising a program of instructions executable by said computer to perform a method for detecting occupancy of a live object(s) in a physical location, said method comprising:

capturing, using an image capturing device, image sequences of said physical location;

extracting a first set of information from said at least one image capturing device at a first time and a second set of information from said at least one image capturing device at a second time, wherein said first set of information comprises an image information on at least one of (a) live objects, (b) stationary object(s), (c) current light levels, and (d) current shadow levels of said image sequences, and wherein said second set of information comprises an image information on at least one of (a) live object, (b) stationary object(s), (c) current light levels, and (d) current shadow levels of said image sequences;

subtracting said second set of information obtained at second time from said first set of information obtained at first time, to obtain an image information on (i) said stationary object(s), and (ii) said live object(s) in said physical location;

estimating track motions of said live object(s) to obtain information of said live object(s);

identifying tags to obtain information on said tags which are blocked by said live object(s); and comparing said image information on said live object(s) obtained from image subtraction, said information of said live object(s), and said information on tags which are blocked by said live object(s), to determine occupancy of said live object(s) in said physical location.

11. The non-transitory program storage device of claim 10, wherein said method further comprises (a) normalizing lighting levels in said image sequences; and (b) removing shadows of said image sequences captured from said at least one image capturing device at said first time and said second time.

12. The non-transitory program storage device of claim 10, wherein said method further comprises: selecting, periodically, images from said image sequences at said second time and subtracting with images from said image sequences at first time to obtain image information on said stationary object(s).

13. The non-transitory program storage device of claim 10, wherein said tags is a Quick Response (QR) code tag, and wherein said Quick Response (QR) code tag is physically tagged to said stationary object(s) in said physical location.

14. The non-transitory program storage device of claim 13, wherein said QR code tag is configured to be detected by said image capturing device.

15. The non-transitory program storage device of claim 10, wherein said live object is masked for privacy protection without affecting inherited property of detected said live object, and wherein said privacy protection is performed before or after determining occupancy of said live objects in said physical location.

16. A method for detecting occupancy of live objects in a physical location, and comprising a program of instructions executable by said computer to perform a method for detecting occupancy of a live object(s) in a physical location, said method comprising:

capturing, using an image capturing device, image sequences of said physical location;

extracting a first set of information from said at least one image capturing device at first time and a second set of information from said at least one image capturing device at second time, wherein said first set of information comprises an image information on at least one of (a) live objects, (b) stationary object(s), (c) current light levels, and (d) current shadow levels of said image sequences, and wherein said second set of information comprises an image information on at least one of (a) live object, (b) stationary object(s), (c) current light levels, and (d) current shadow levels of said image sequences;

subtracting said second set of information obtained at second time from said first set of information obtained at first time, to obtain an image information on (i) said stationary object(s), and (ii) said live object(s) in said physical location;

identifying tags to obtain information on said tags which are blocked by said live object(s); and comparing, said image information on said live object(s) obtained from image subtraction, and said information on tags which are blocked by said live object(s), to determine occupancy of said live object(s) in said physical location.

17. The method of claim 16, further comprising:
estimating track motions of said live object(s) to obtain information of said live object(s).

18. The method of claim 16, further comprising:
comparing said image information on said live object(s) obtained from image subtraction, said information of said live object(s), and said information on tags which are blocked by said live object(s), to determine occupancy of said live object(s) in said physical location.

19. The method of claim 16, further comprising (a) normalizing lighting levels in said image sequences; and (b) removing shadows of said image sequences captured from said at least one image capturing device at said first time and said second time.

20. The method of claim 16, further comprising:
selecting, periodically, images from said image sequences at said second time and subtracting with images from said image sequences at first time to obtain image information on said stationary object(s).

* * * * *